United States Patent Office 3,652,763
Patented Mar. 28, 1972

3,652,763
GROWTH STIMULANT COMPOSITION
Julius Berger, Passaic, Wilbur Lewis Marusich, Wayne, and Milan Mitrovic, Nutley, N.J., assignors to Hoffmann-La Roche Inc., Nutley, N.J.
No Drawing. Filed Apr. 28, 1969, Ser. No. 820,023
Int. Cl. A61k 21/00
U.S. Cl. 424—181
4 Claims

ABSTRACT OF THE DISCLOSURE

A composition and method for stimulating the growth of poultry and increasing feed efficiency comprising orally administering chartreusin to the animals in combination with their feed. The method comprises feeding poultry a ration containing, per 100 parts by weight of feed, from about 0.0001 to about 0.01 parts by weight of chartreusin.

BRIEF SUMMARY OF THE INVENTION

This invention relates to effective, useful and novel compositions which upon administration to poultry produce stimulation of the growth rate and enhancement of the feed efficiency of the animals, and to methods of administering these comparisons to attain the desired results. More particularly, it is concerned with the use of the known antibiotic chartreusin as the active ingredients in these growth promoting compositions. Further, it is concerned with the production and use of a nutritionally balanced poultry feed containing chartreusin.

Chartreusin has been found, when administered to poultry in combination with their feed or drinking water, to stimulate the growth and increase the feed efficiency of the animals. Both these results produced by the chartreusin additive are of obvious economic value in that the animals are able to attain market size much sooner and on much less feed.

The compositions of the present invention can be prepared in any one of several ways. For example, a composition can be prepared by uniformly distributing chartreusin throughout an edible and non-toxic carrier or diluent. It is preferred that the carrier or diluent be a material having nutritional value for poultry; with a high energy poultry feed being the most preferred carrier and drinking water being the most preferred diluent. In this way, the antibiotic is incorporated directly into the carrier or diluent.

In an alternate embodiment of the invention, chartreusin can be added to an edible, non-toxic carrier or diluent, preferably a material having a nutritional value for poultry, to provide a highly concentrated pre-mix. This pre-mix can then be added to and uniformly distributed through the feed.

In still another embodiment of the present invention, a pre-mix can be prepared containing chartreusin in liquid form. In preparing the liquid form of the antibotic, it is preferable to use the alkali metal salts of the chartreusin.

It has been found that the addition of a low level of the antibotic chartreusin to the feed or drinking water of poultry, so that the animals receive the antibiotic over an extended period of time including the majority of their growth period, results in a marked increase in the rate of growth of the animals as well as an improvement in their feed efficiency.

DETAILED DESCRIPTION OF THE INVENTION

As discussed above, the present invention comprises orally administering to poultry the antibiotic chartreusin in combination with their feed or drinking water. The presence of the chartreusin acts to stimulate the growth and enhance the feed efficiency of the animals.

The antibiotic chartreusin is well known in the art. It is produced by cultivating the organism *Streptomyces chartreuses*. The species *Streptomyces chartreusis* described herein includes all strains of this organism which are operable to produce the desired antibiotic and which cannot be definitely differentiated from the above indicated strains and its subcultures including mutants and variants. A culture of the organism *S. chartreusis* has been deposited in the collection of microorganisms in the United States Department of Agriculture, Northern Utilization Research and Development Division, Peoria, Ill., under Registration Number 2441.

The crystalline preparation of chartreusin free acid has the formula $C_{32}H_{32}O_{14}$ and possesses the following structural configuration:

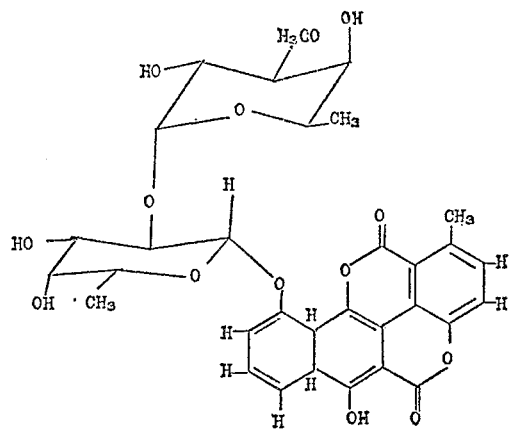

The chartreusin crystals appear as pale yellow-green rhombic platelets, M.P. 185°; they are insoluble in water, but easily form the sodium salt, which has a solubility in water of at least 20 mg./ml.

As noted above, the ingredient responsible for the increased growth and enhanced feed efficiency of the poultry is the antibiotic chartreusin. When used in preparing the various compositions of this invention, the chartreusin component is selected from the group consisting of the free acid and any pharmaceutically acceptable salt thereof. Among such suitable salts may be included inorganic salts, i.e., alkali metal salts, such as those of sodium, potassium, lithium and the like, and alkaline earth metal salts, such as those of calcium and barium. These salts can be readily prepared from chartreusin free acid according to conventional techniques. In the discussion that follows, the term chartreusin will be used to denote chartreusin in the form of its free acid and in the form of the pharmaceutically acceptable salts thereof.

The supplemental poultry feed compositions of the present invention can be made by simply mixing chartreusin with the ingredients that normally comprise a conventional poultry feed or preferably by adding a pre-mix containing the antibiotic to the feed. In the case where chartreusin is added directly to the feed, the mixing step can be accomplished by employing known methods. In one such method, the nutrient materials which comprise the poultry feed are fed, either individually or collectively, into a batch mixer with chartreusin. The mixer is operated until the product contains a uniform distribution of ingredients throughout.

In a preferred embodiment of this invention the active ingredient chartreusin is incorporated into a concentrated pre-mix which can then be added to the poultry feed. In preparing this solid form pre-mix containing chartreusin as the active ingredient, any suitable carrier or extender material can function as the inert ingredient provided that it be inert to the active chartreusin additive and be non-toxic to the poultry receiving the composition. Numerous solid materials satisfy these requirements and, therefore, will function efficaciously for the purpose of the present invention. Representative of such solid materials are mineral sources such as ground oyster shells, edible cereals, vegetable, marine or animal materials such as are present in commercial animal feeds, corn meal, citrus meal, soybean meal, fish meal, meat scraps, dried fermentation residues and the like.

The chartreusin may be blended with one or more of the suitable solid materials into a mash, pellet, or any desired configuration by any known and convenient technique. For example, the composition can be formed by finely dividing or pulverizing the active ingredient and the inert ingredients using any commercially available grinder. If the feed material is not present when the grinding or the pulverizing is effected, the resultant material can be distributed in accordance with the present invention in any conveniently available feed material.

The poultry feeds used as carriers for the chartreusin will vary to some extent depending on the individual needs of the species and on the final use being made of the animals. However, in general these feeds will provide sources of carbohydrates, such as grains, meals, flours, sugars, etc. Further, the feed will provide protein sources, such as soybean meal, corn, peanuts, fish meal, etc. The mineral and vitamin balances are also maintained by addition of the needed minerals, i.e. calcium carbonate, potassium, sodium, magnesium, etc., and vitamines, i.e. A, $B_{12}$, D, thiamine, etc., to the feed. In addition, the feed may contain other conventional feed additives, including but not limited to hormones, enzymes, fats, etc.

As is evidenced from the above discussion, the feed compositions produced according to the present invention are intended for oral ingestion. They can be added to the normal feed supply of the animal. Administration of the active ingredient must be made in consideration of the requirements of the specific poultry being treated.

The inert ingredients of the growth promoting compositions of the present invention may also be present in liquid form or may comprise a combination of both solid and liquid forms. Liquid dispersions can be prepared by using water or vegetable oils preferably including a surface active agent, emulsifying agents and the like in the liquid dispersion, and solubilizers. Especially preferred for this purpose are the alkali metal salts of chartreusin since their solubility in water renders them eminently well suited for use in the preparation of liquid dispersions. However, any salt of chartreusin which is soluble in water and is pharmaceutically acceptable is suitable for the purpose of preparing a liquid form of the growth promoting composition of the present invention.

As in the case of the solid forms of the growth promoting composition, a pre-mix is also preferred in connection with the preparation of the liquid dispersions. The liquid pre-mix is prepared by adding the salts of chartreusin to water, preferably in the presence of surface active agents, emulsifying agents, solubilizing agents, etc. which are pharmaceutically acceptable to the animal to be treated. The liquid form may then be added to the water supply of the animal. It is ingested ad libitum when the animal satisfies his normal water needs.

The quantity of chartreusin required to achieve the desired growth rate stimulation and feed efficiency enhancement is critical, but may vary within the prescribed range. Preferably, when used in conjunction with the animal's feed supply, the improved growth promoting composition of the present invention comprises a supplemental poultry feed having dispersed therein per 100 parts by weight of feed from about 0.0001 part by weight to about 0.01 part by weight of said active material; namely, chartreusin or pharmaceutically acceptable salts thereof. Higher concentrations of chartreusin than 0.01 part by weight per 100 parts by weight of feed do not generally show improved results over the results obtained with the 0.01 part per 100 concentration. Thus, it is not advantageous to use amounts greater than 0.01 part by weight of active ingredient per 100 parts by weight of feed. In a preferred embodiment of the invention, the novel growth promoting composition comprises a supplemental poultry feed containing per 100 parts by weight of feed, from about 0.0050 part by weight to about 0.01 part by weight of the active ingredient chartreusin.

In cases where the growth promoting composition is added to the animal's drinking supply, it is preferred that a quantity of the composition be added so that there is administered to the poultry, when he ingests his normal water intake, an aqueous medium containing per liter from about 0.5 to about 50 mgs. of a compound selected from the group consisting of the pharmaceutically acceptable salts of chartreusin, with the preferred ratio being 25 mgs. of active material per liter of water.

As indicated above, the preferred practice of the invention involves initially preparing a concentrated pre-mix containing the active ingredient chartreusin. Preparation of a pre-mix which can later be added to the feed provides a convenient method of using the growth promoting composition and insures the proper distribution of the active ingredient throughout the feed. The amount of chartreusin present in the pre-mix is not critical to the operability of the invention. The objectives of the invention are achieved, regardless of the level of chartreusin in the pre-mix, by utilizing a quantity of the pre-mix capable of providing a final feed containing an effective level of chartreusin as defined above. The pre-mix is a convenient manner of supplying the composition to the feed manufacturer or poultry raiser who can then mix suitable amounts of the pre-mix with the available supply of poultry feed in order to produce a final feed containing an effective level of chartreusin.

The nature and objects of the present invention can be more fully understood by making reference to the following examples. The examples are given merely as further illustration of the invention and are not to be construed as limiting the scope of the disclosure. Unless otherwise indicated, all parts given in the examples are parts by weight.

Example 1

In this example, a basal ration was employed containing the following named ingredients in the quantities hereinafter indicated:

| | Percent by weight |
|---|---|
| Ground yellow corn | 56.075 |
| Meat and bone meal (50% portein) | 4.000 |
| Fish meal (60% protein) | 4.000 |
| Soybean meal (50% protein) | 28.000 |
| Dehydrated alfalfa meal | 1.000 |
| Animal fat | 4.000 |
| Methionine | 0.200 |
| Rock phosphate | 0.250 |
| Calcium carbonate | 1.200 |
| Iodized salt | 0.250 |
| Vitamin supplement | 1.000 |
| Trace mineral supplement | 0.025 |

The free acid of chartreusin was added to this ration in a ratio of 50 milligrams of antibiotic per kilogram of ration.

The growth stimulating effects of the chartreusin were determined by allowing poultry to feed, ad libitum, on the chartreusin supplemented ration. In the test, one day old Cornish cross sexed broiler chicks were used. The test utilized 10 chicks per replicate (5 males and 5 females). The replicate groups were permitted access to the ration. A planned random distribution of the replicates was made to equalize factors of heating, light and position. The birds were observed over a two week period, with group weight being determined several times during the period and individual weights being determined at the end of 14 days. Feed consumption was also recorded and improvement in feed efficiency, as compared to the control, was calculated.

| Antibiotic supplement mg./kg. feed | | | Two week gains [1] (grams) | | | Percent gain | | | Feed efficiency | | | Percent improved feed efficiency | | |
|---|---|---|---|---|---|---|---|---|---|---|---|---|---|---|
| Control | Test 1 | Test 2 | Control | Test 1 | Test 2 | Control | Test 1 | Test 2 | Control | Test 1 | Test 2 | Control | Test 1 | Test 2 |
| 0 | 50 | 100 | 146 | 157 | [2] 163 | 100 | 108 | 117 | 1.48 | 1.42 | 1.33 | | +4 | +10 |

[1] Average for 40 birds.
[2] Average for 20 birds.

A control experiment was carried out simultaneously, in the manner described as above, except that the chicks which were used in the control test were allowed to feed, ad libitum, on a ration which contained the same nutrient ingredients but did not contain the chartreusin additive.

The average gain for each test group is divided by the average gain of the negative control group and the quotient multiplied by 100 to yield the percent weight gain. Gain is the final body weight of the chick at the end of the 2 week test minus the beginning weight of 1 day of age.

$$\frac{(Av.\ final\ wt. - av.\ initial\ wt.\ of\ test\ group)}{(Av.\ final\ wt. - av.\ initial\ wt.\ of\ control\ group)} \times 100 = \text{percent wt. gain}$$

The table which follows summarizes the results of the experiment.

culated. The following table records the results of the experiment.

The results set forth in the table demonstrate that the presence of chartreusin in concentration of 0.005 part by weight per 100 parts feed and 0.01 part by weight per 100 parts feed brings about an improvement in the growth rate of the poultry as compared to the control. The results also show that an enhancement in feed efficiency occurs when chickens are fed a ration containing an effective level of chartreusin.

We claim:
1. A composition for stimulating the growth and enhancing the feed efficiency of poultry which comprises chartreusin free acid, or a pharmaceutically acceptable salt thereof, and a high energy nutrient feed for poultry containing a carbohydrate source and a protein source, wherein the chartreusin or a salt thereof is present in a ratio by weight of from about 0.0001 part to about 0.01 part per 100 parts of nutrient feed.

2. The composition of claim 1 wherein an alkali metal salt of chartreusin free acid is present.

3. A composition for stimulating the growth and enhancing the feed efficiency of poultry which comprises a premixture of chartreusin free acid, or a pharmaceutically acceptable salt thereof, and an inert, nontoxic carrier selected from the group consisting of ground oyster shells, cereals, vegetable meals, fish meals and meat scraps where-

| Antiobiotic supplement (mg./kg. feed) | | Two week gain [1] (grams) | | Percent gain | | Feed efficiency | | Percent improved feed efficiency | |
|---|---|---|---|---|---|---|---|---|---|
| Basal control | Antibiotic chartreusin | Basal control | Antibiotic chartreusin | Basal control | Antibiotic chartreusin | Basal control | Antibiotic chartreusin | Basal control | Antibiotic chartreusin |
| 0 | 50 | 154 | 169 | 100 | 110 | 1.55 | 1.41 | | +10 |

[1] Average for 40 chicks.

From the foregoing table, it is seen that the chickens fed on the ration supplemented with 50 mg. of chartreusin per kilogram of feed experienced an increased growth rate as compared to the control. At the same time, as indicated by a 10 percent improvement in feed efficiency, the same birds made more effective use of their feed.

Example 2

The experiment described in Example 1, including the control, was repeated several times using the same basal ration as employed in Example 1. In these trials, the level of chartreusin was varied. In one test, the chickens (four replicates of 10 chickens) were allowed to feed on a ration supplemented with 50 mg. of the free acid of chartreusin per kilogram of feed. In a second test two replicates of 10 birds were allowed to feed on a ration which was supplemented with 100 mg. of chartreusin per kilogram of feed. This study was repeated to confirm the results. In the control test four replicates of ten birds were allowed to feed on a basal ration devoid of the antibiotic supplement. In all test, growth rate over a two week period was observed in comparison to the control group. Feed consumption was also recorded and improvements in feed efficiency in comparison to the control were calin said premixture upon addition to a conventional poultry feed produces a feed containing per 100 parts by weight of feed from about 0.0001 to about 0.01 part by weight of chartreusin or a salt thereof.

4. A method for stimulating the growth and enhancing the feed efficiency of poultry which comprises orally administering to poultry as their regular feed requirement a composition containing chartreusin, or a pharmaceutically acceptable salt thereof, and a high energy nutrient feed for poultry containing a carbohydrate source and a protein source, wherein said chartreusin or said salt thereof is present in a ratio by weight of from about 0.0001 part to about 0.01 part of chartreusin or a salt thereof per 100 parts carrier.

References Cited

Goldberg, Antibiotics, Their Chem. and Wow-Med. Uses, D. Van Nostrand Co., Inc., 1964, p. 178.

Merck Index, 8th Edition, Merck & Co., Inc., 1968, p. 228.

Leach et al. J. Am. Chem. Soc. 75 (1953), p. 4011 and 4012.

JEROME D. GOLDBERG, Primary Examiner